US012664881B2

(12) United States Patent
Jarral et al.

(10) Patent No.: US 12,664,881 B2
(45) Date of Patent: Jun. 23, 2026

(54) INFRARED SIGNAL PROTOCOL DETECTION

(71) Applicant: DiversiTech Corporation, Duluth, GA (US)

(72) Inventors: Anees Ahmed Jarral, Islamabad (PK); Waseem Amer, Islamabad (PK); Umair Nawaz Khan, Rawalpindi (PK); Muhammad Zeeshan Ashraf, Islamabad (PK); Syeda Farwa Batool, Rawalpindi (PK); Aftab Farooqi, Redmond, WA (US)

(73) Assignee: DiversiTech Corporation, Duluth, GA (US)

( * ) Notice: Subject to any disclaimer, the term of this patent is extended or adjusted under 35 U.S.C. 154(b) by 272 days.

(21) Appl. No.: 18/515,735

(22) Filed: Nov. 21, 2023

(65) Prior Publication Data

US 2025/0166495 A1 May 22, 2025

(51) Int. Cl.
*G08C 23/04* (2006.01)

(52) U.S. Cl.
CPC .................................... *G08C 23/04* (2013.01)

(58) Field of Classification Search
None
See application file for complete search history.

(56) References Cited

U.S. PATENT DOCUMENTS

2010/0123598 A1* 5/2010 Brodersen ............. G08C 19/28
340/12.19
2010/0317332 A1* 12/2010 Bathiche .......... H04N 21/43637
455/418
2020/0242918 A1* 7/2020 Pan ...................... H04B 10/114

* cited by examiner

*Primary Examiner* — David W Lambert
(74) *Attorney, Agent, or Firm* — Dentons US LLP

(57) ABSTRACT

A cloud-based infrared signal protocol detector that is able to detect signal protocols for infrared-controlled devices and appliances and is able to generate new signal models for infrared signal protocols that cannot be detected. In an embodiment, the cloud-based infrared signal protocol detector comprises a signal capture and processing circuit, a cloud-based service comprising a signal protocol detector, an IR signal database comprising one or more signal models, and a new signal model manager.

14 Claims, 7 Drawing Sheets

Exemplary Algorithm for Signal Protocol Detection & New Model Creation 600

Exemplary IR Signal Capture and Processing Circuit 200

Exemplary Algorithm for Signal Protocol Detection & New Model Creation 600

INFRARED SIGNAL PROTOCOL DETECTION

CROSS-REFERENCE TO RELATED APPLICATIONS

Priority is claimed in the application data sheet to the following patents or patent applications, each of which is expressly incorporated herein by reference in its entirety:

None.

BACKGROUND

Field of the Art

The present invention is in the field of electronics and more particularly infrared signal protocol detection.

Discussion of the State of the Art

Consumers in today's world often have multiple household devices and appliances that are controlled via infrared (IR) remote controllers. Three common examples of such devices include ductless heating, ventilation, and air conditioning (HVAC) appliances (mini split units, window units, and portable units), flat-screen televisions, and media players such as digital video disc (DVD) and Blu-ray players. These devices are may be installed or used at multiple locations in homes and offices, but are individually controlled by a conventional infrared (IR) remote control provided with each unit by the manufacturer. The IR remote controls relay user commands to the appliances for appropriate action such as changing channels, changing volumes, setting fan speeds, setting room temperatures, setting heating or cooling modes, playing and pausing music, etc.

However, the signal protocols used by each manufacturer are proprietary, making the IR-controlled devices and appliances difficult to use with third party equipment and peripherals. Any third party equipment and peripherals must somehow be programmed with the IR signal protocol for the devices and appliance with which they are to be used. Direct signal recording from the device's original IR controller to the third party equipment or peripheral can be used, but is inefficient and does not always work.

What is needed is a cloud-based infrared signal protocol detector that is able to detect signal protocols for infrared-controlled devices and appliances and is able to generate new signal models for infrared signal protocols that cannot be detected.

SUMMARY

Accordingly, the inventor has conceived and reduced to practice, is a cloud-based infrared signal protocol detector that is able to detect signal protocols for infrared-controlled devices and appliances and is able to generate new signal models for infrared signal protocols that cannot be detected. In an embodiment, the cloud-based infrared signal protocol detector comprises a signal capture and processing circuit, a cloud-based service comprising a signal protocol detector, an IR signal database comprising one or more signal models, and a new signal model manager.

According to a preferred embodiment, a system for infrared signal protocol detection is disclosed, comprising: a signal capture and processing circuit comprising an infrared (IR) receiver configured to receive infrared signals for infrared-controllable devices and a microcontroller for decoding received infrared signals into signal protocol characteristics; a computing device comprising a memory, a processor, and a non-volatile data storage device; an IR signal database stored on the non-volatile data storage device, the IR signal database comprising one or more signal models, each signal model comprising one or more signal protocol characteristics; and a signal protocol detector comprising a first plurality of programming instructions stored in the memory which, when operating on the processor, causes the computing device to: receive a first IR signal from the signal capture and processing circuit, the first IR signal corresponding to a function of an IR remote controller and comprising a first signal protocol characteristic; match the first IR signal to a signal model stored in the IR signal database by comparing the first signal protocol characteristic with a second signal protocol characteristic of the signal model, the second signal protocol characteristic of the signal model matching the first signal protocol characteristic within a pre-determined margin of error; and transmit the signal model to a device configured to use the signal model for operation of an IR-controllable device.

According to a preferred embodiment, a method for infrared signal protocol detection is disclosed, comprising the steps of: using a signal capture and processing circuit comprising an infrared (IR) receiver to receive infrared signals for infrared-controllable devices and a microcontroller to decode received infrared signals into signal protocol characteristics; storing an IR signal database stored on a non-volatile data storage device of a computing device comprising a memory, a processor, and the non-volatile data storage device, the IR signal database comprising one or more signal models, each signal model comprising one or more signal protocol characteristics; using a signal protocol detector operating on the computing device to perform the steps of: receiving a first IR signal from the signal capture and processing circuit, the first IR signal corresponding to a function of an IR remote controller and comprising a first signal protocol characteristic; matching the first IR signal to a signal model stored in the IR signal database by comparing the first signal protocol characteristic with a second signal protocol characteristic of the signal model, the second signal protocol characteristic of the signal model matching the first signal protocol characteristic within a pre-determined margin of error; and transmitting the signal model to a device configured to use the signal model for operation of an IR-controllable device.

According to an aspect of an embodiment, the first IR signal comprises a first plurality of signal characteristics comprising a first start sequence, a first end sequence, and a first data sequence comprising one or more data bits; the signal model comprises a second plurality of signal characteristics comprising a second start sequence, a second end sequence, and a second data sequence comprising one or more data bits; and the signal protocol detector matches the first IR signal to the signal model by comparing one or more of the first plurality of signal characteristics to one or more of the second plurality of signal characteristics within a pre-determined margin of error.

According to an aspect of an embodiment, a new signal model manager is used to: where no match is found between the first IR signal and any signal model in the IR signal database, initiate a new signal model creation process causing the computing device to: create a new signal model from the first plurality of signal protocol characteristics; transmit instructions for generation of additional IR signals from the IR remote controller, each instruction comprising a request to operate a certain function of the IR remote controller;

receive the additional IR signals from the signal capture and processing circuit; and for each additional IR signal received: determine which data bits of the one or more data bits of the first data sequence have changed; associate the changed data bits with the certain function requested for that IR signal received; infer a range of values for the certain function from the changed data bits; and update the new signal model with the association of the changed data bits with the certain function and the inferred range of values for the certain function; and transmit the new signal model to the device configured to use the new signal model for operation of an IR-controllable device According to an aspect of an embodiment, the computing device is a cloud-based service.

According to an aspect of an embodiment, the instructions are transmitted to a mobile device via an application operating on the mobile device.

According to an aspect of an embodiment, the instruction are transmitted to a mobile device via text messaging or email.

According to an aspect of an embodiment, the instructions are transmitted to a call center for an agent to remotely assist a user in following the instructions.

According to an aspect of an embodiment, the signal capture and processing circuit is embedded into the device to which the signal model is transmitted.

According to an aspect of an embodiment, the device to which the signal model is transmitted is a smart thermostat configured to control IR-controllable ductless HVAC devices.

BRIEF DESCRIPTION OF THE DRAWING FIGURES

DETAILED DESCRIPTION

Figure 1:
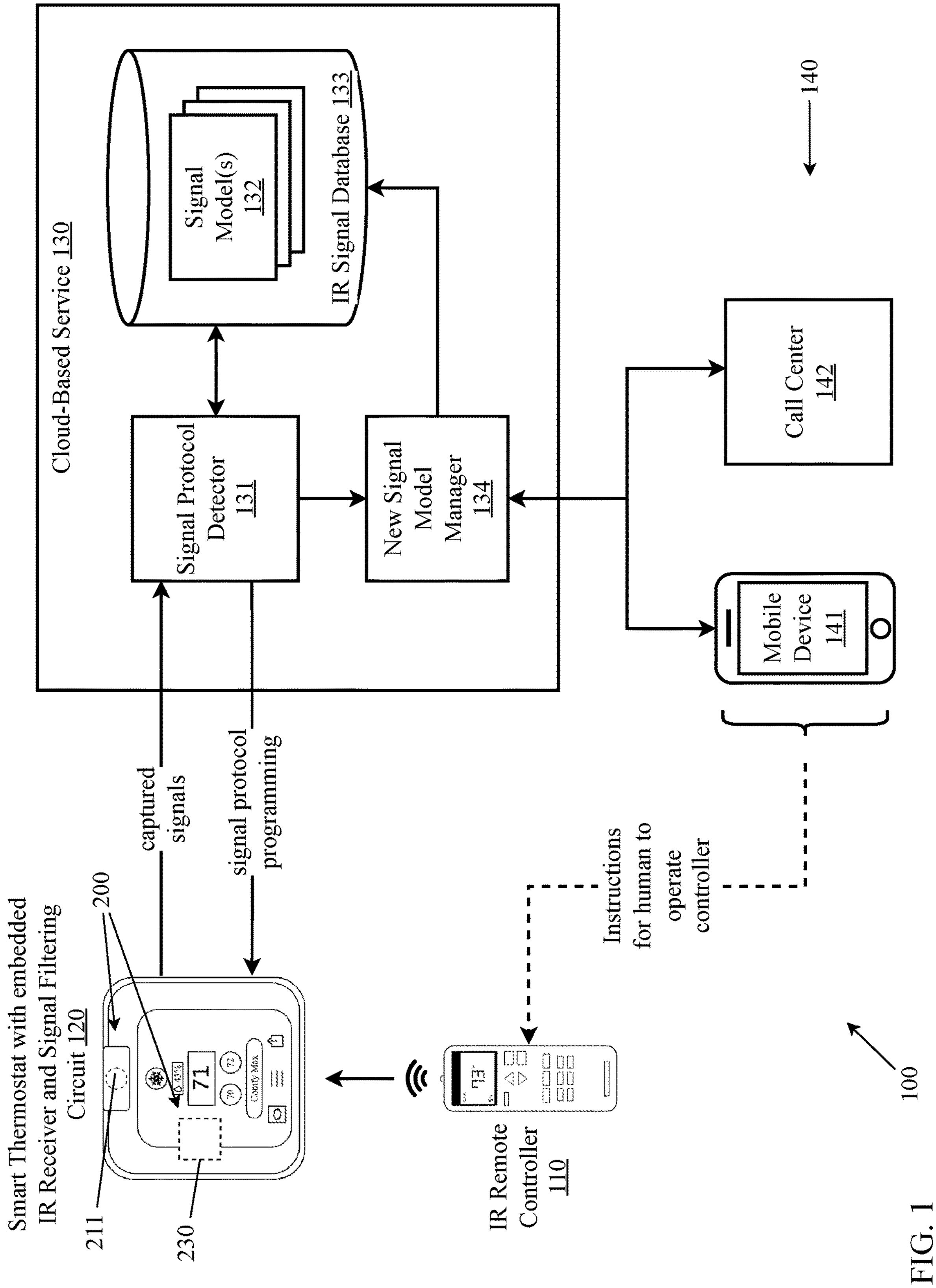
FIG. 1 is a block diagram illustrating an exemplary system architecture for a system for infrared signal protocol detection.

The inventor has conceived, and reduced to practice, a cloud-based infrared signal protocol detector that is able to detect signal protocols for infrared-controlled devices and appliances and is able to generate new signal models for infrared signal protocols that cannot be detected. In an embodiment, the cloud-based infrared signal protocol detector comprises a signal capture and processing circuit, a cloud-based service comprising a signal protocol detector, an IR signal database comprising one or more signal models, and a new signal model manager.

Consumers in today's world often have multiple household devices and appliances that are controlled via infrared (IR) remote controllers. Three common examples of such devices include ductless heating, ventilation, and air conditioning (HVAC) appliances (mini split units, window units, and portable units), flat-screen televisions, and media players such as digital video disc (DVD) and Blu-ray players. These devices are may be installed or used at multiple locations in homes and offices, but are individually controlled by a conventional infrared (IR) remote control provided with each unit by the manufacturer. The IR remote controls relay user commands to the appliances for appropriate action such as changing channels, changing volumes, setting fan speeds, setting room temperatures, setting heating or cooling modes, playing and pausing music, etc.

However, the signal protocols used by each manufacturer are proprietary, making the IR-controlled devices and appliances difficult to use with third party equipment and peripherals. Any third party equipment and peripherals must somehow be programmed with the IR signal protocol for the devices and appliance with which they are to be used. Direct signal recording from the device's original IR controller to the third party equipment or peripheral can be used, but is inefficient and does not always work.

Direct signal recording involves capturing a sample of an infrared signal directly from an infrared remote controller for each button on the infrared remote controller and labeling that wave form with its function. For example, if one has an infrared remote controller from a particular IR device manufacturer, one can press a button on that infrared remote controller (e.g., the "on/off" button), capture a sample (e.g., a 1-second sample) of the infrared signal emitted by the infrared remote controller using an infrared receiver, and save the captured sample with a label indicating its function (e.g., "device on/off"). The saved IR sample can then be emitted by a third party device to operate that function on an IR device from that manufacturer. The structure of the wave form in the sample does not need to be known and the signal does not need to be decoded. However, direct signal recording requires that this process be completed for each button of the infrared remote controller for which functionality is desired (e.g., on/off, volume up, volume down, etc.).

Using the system and method described herein, a single infrared signal from an infrared remote controller may be captured using an IR receiver, decoded using a signal processing circuit, and matched to signal models existing in a database. When a match is found for the single infrared signal, all of the functionalities of that infrared remote controller existing in the database are known and may be transferred to a third party device for operation of an IR device compatible with that controller.

Detection is performed on the decoded IR signal using a detection algorithm which compares the decoded IR signal to signal models in a database using one more of the following signal characteristics: a start sequence (or header) comprising the start timing of the signal, a data sequence comprising a number of data bits in the signal (which may also be referred to as the signal wavelength), a zero-bit timing of the signal, a one-bit timing of the signal, one or more intra-signal delay timings, an end sequence comprising an end timing of the signal, and an inter-signal delay timing. These signal characteristics are typically proprietary to each manufacturer of IR devices and their associated IR remote controllers. The proprietary nature of the signal characteristics makes use with third party devices and peripherals difficult. However, using the system and method described herein, the complete signal functionality (and often the manufacturer and model) of a given IR remote controller can be identified and recreated for use with third party devices and peripherals, requiring only a single signal to be captured from that IR remote controller.

While the examples herein discuss embodiments associated with HVAC appliances, the system and method described herein are not limited to HVAC appliances, and include any device or appliance controlled by an IR remote controller, some common and non-limiting examples of which are ductless heating, ventilation, and air conditioning (HVAC) appliances (mini split units, window units, and portable units), flat-screen televisions, media players such as digital video disc (DVD) and Blu-ray players, and children's toys. For example, the algorithms described herein for identifying and applying signal functionality from an IR remote controller for a ductless HVAC system can be applied to identifying and applying signals from an IR remote controller for a television, media player, or to operating children's toys. While most infrared-controlled devices use a similar signal structure, the system and method described herein can be adapted to create new signal models for dissimilar or new signal structures, as well.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF DRAWING FIGURES

FIG. 1 is a block diagram illustrating an exemplary system architecture for a system for infrared signal protocol detection. The system of this embodiment comprises a signal capture and processing circuit 200 comprising an IR receiver 210 and a microcontroller 230 configured to decode incoming infrared signals, and a cloud-based service 130 configured to both match decoded IR signals to existing signal models and to create new signal models for unmatched IR signals. The system may receive IR signals from an IR remote controller 110 and may send instructions for acquiring additional IR signals for model creation to external devices or systems 140. In this embodiment, IR receiver 210 and signal capture and processing circuit 122 are shown as being embedded in a smart thermostat 120 to show a use case to which the system and method described herein may be applied.

In this embodiment, IR receiver 210 and a microcontroller 230 are shown as being embedded in a third party (i.e., not provided by the IR device manufacturer) smart thermostat for use in controlling a ductless HVAC device and providing additional, non-original-equipment-manufacturer (non-OEM) functionality for controlling the ductless HVAC device. IR receiver 210 receives an infrared (IR) signal for a given function from the IR remote controller 110 (i.e., a signal corresponding to a button pressed on the IR remote controller such as the on/off button, the temperature increase button, etc.). The IR signal is captured using the IR receiver 210, decoded using the microcontroller 230, and sent to a cloud-based service 130 for signal protocol detection and matching.

The cloud-based service 130 performs both signal matching with existing signal models and, where no match is found, creation of new signal models. The IR signal sent by smart thermostat 120 is received by a signal protocol detector 131 which attempts to match the IR signal to one or more signal models 132 existing in an IR signal database 133. When a match is found for the IR signal, additional functionalities of that IR remote controller that exist in the database are known and may be transferred to a third party device for operation of an IR device compatible with that controller. Some or all of these additional functionalities of the IR remote controller are known because the structure of the signal model contains information about which bits of the data bits control which functions, which is determined during signal model training as is described herein below.

Detection is performed on the decoded IR signal by the signal protocol detector 131 using a detection algorithm which compares the decoded IR signal to signal models in a database using one more of the following signal characteristics: a start sequence (or header) comprising the start timing of the signal, a data sequence comprising a number of data bits in the signal (which may also be referred to as the signal wavelength), a zero-bit timing of the signal, a one-bit timing of the signal, one or more intra-signal delay timings, an end sequence comprising an end timing of the signal, and an inter-signal delay timing. These signal characteristics are typically proprietary to each manufacturer of IR devices and their associated IR remote controllers. The proprietary nature of the signal characteristics makes use with third party devices and peripherals difficult. However, using the system and method described herein, some or all of the signal functionality (and often the manufacturer and model) of a given IR remote controller can be identified and recreated for use with third party devices and peripherals from a single signal captured from that IR remote controller.

Where a match for the IR signal is not found in the IR signal database 133, a new signal model manager 134 is used to create a new signal model for the IR remote controller from which the IR signal was received. The new signal model manager 134 receives the unmatched signal from the signal protocol detector and identifies the overall structure of the signal, including a start sequence (or header) comprising the start timing of the signal, a data sequence comprising a number of data bits in the signal (which may also be referred to as the signal wavelength), a zero-bit timing of the signal, a one-bit timing of the signal, one or more intra-signal delay timings, an end sequence comprising an end timing of the signal, and an inter-signal delay timing. Each of these characteristics can be identified by the new signal model manager 134 based on known properties of IR signals. For example, the start timing, end timing, and inter-signal delay can be calculated by identifying where the overall signal repeats. The "zero" bit timing and the "one" bit timing are typically substantially shorter than the start timing, end timing, intra-signal delays (if any), and inter-signal delay, and are thus readily distinguishable from those characteristics. The "zero" bit timing is typically shorter than the "one" bit timing, although variance from that patterns can be identified during signal model training. Intra-signal delays can be identified because they are typically longer than the "zero" bit timing and the "one" bit timing and interrupt sequences of "zero" and "one" bit without an end timing having been received.

What is not known at this point are which data bits control which functions of the IR-controlled device. Mapping the data bit functions is performed during signal model training, during which a human user is asked to press certain buttons on the IR remote control, and the signal received from each button press is compared to one or more previous signals received for other buttons to identify which data bits have changed. For example, the human user may be asked to press a first button for "fan speed low" on an IR remote controller, resulting in a first IR signal. The new signal model manager 134 analyzes the first IR signal received to determine its structure and creates a new signal model from the structure. The human user is then asked to press a second button for "fan speed high" on the IR remote controller, resulting in a second IR signal. The new signal model manager 134 compares the second IR signal with the first IR signal and determines that a certain 3-bit sequence has changed from 001 to 111. It can be determined from this comparison that the identified 3-bit sequence controls the fan speed and has a total of 8 fan speed settings (likely plus 000 for off). It can be further surmised that the 8 fan speed settings are in sequential order (from binary 001 to binary 111). Using this process, two button pushes have identified a primary function and total of 8 settings for that function. Thus, it can be seen that not every combination of functions and settings must be activated in order to create a signal model, and that a signal model can be created for most or all functions and settings of the IR-controllable device by pushing just a few buttons on the IR remote controller corresponding to primary functions of the IR-controllable device.

Figure 2:
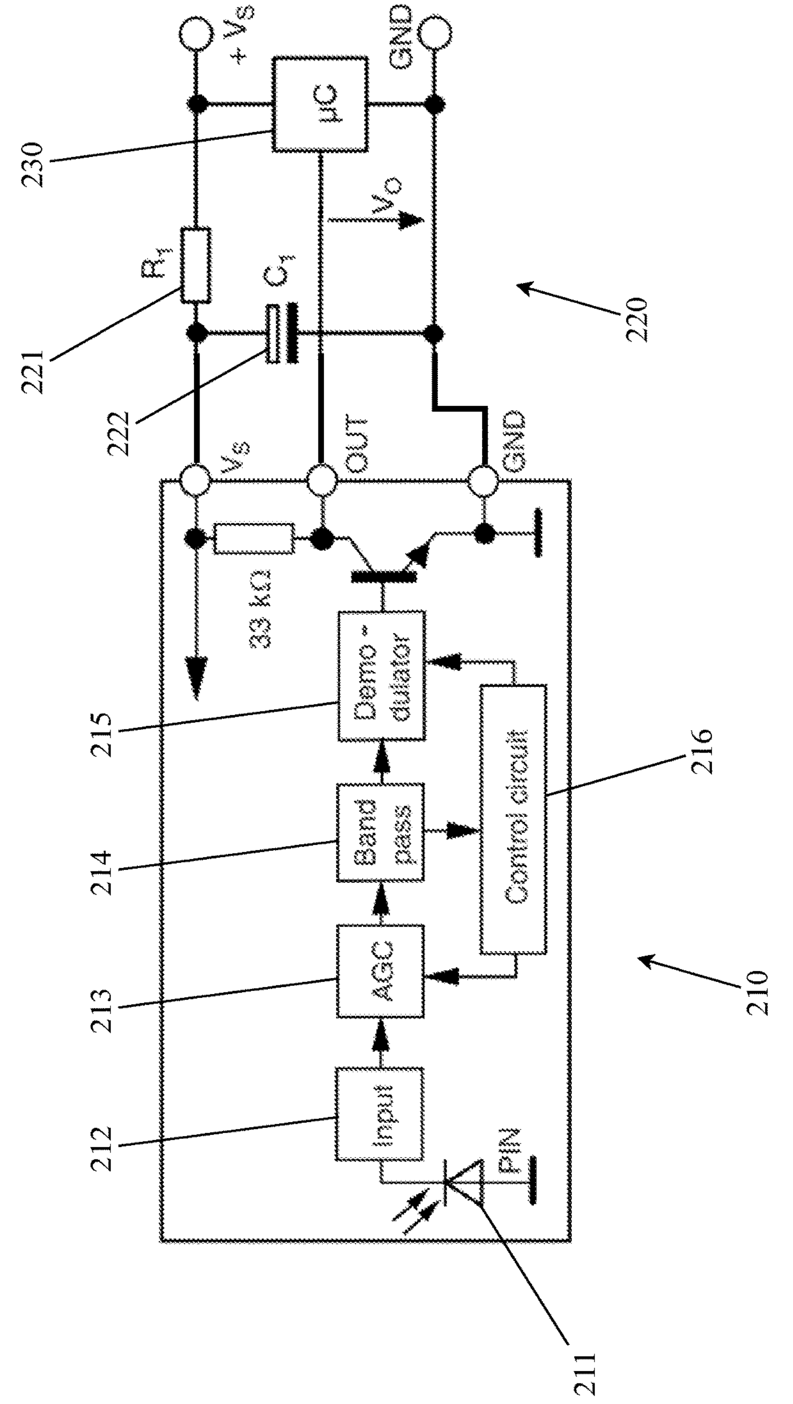
FIG. 2 is a block diagram illustrating an exemplary IR signal capture and processing circuit for use in infrared signal protocol detection.

FIG. 2 is a block diagram illustrating an exemplary IR signal capture and processing circuit for use in infrared signal protocol detection. The IR signal capture and processing circuit comprises an IR receiver 210, an RC filter 220, and a microcontroller 230 specially programmed for decoding the signal for use in infrared signal protocol detection.

The infrared (IR) receiver 210 in this example is a commercially-available IR receiver having an infrared-sensitive diode 211 for receiving IR signals as analog waveform input 212. The analog waveform input 213 is passed through an automatic gain control (AGC) circuit that reduces the sensitivity of the circuit to signal noise. A bandpass filter 214 is used to pass through carrier waver frequencies in the frequency ranges commonly-used for IR signals and reject frequencies outside of those ranges. For example, commonly used carrier wave frequencies for IR control are 36 kHz, 38 kHz, 40 kHz, 42 kHz, 48 kHz, 56 Hz, with 38 kHz being a commonly-used standard. A demodulator 215 is used to extract the signal data from the carrier wave frequency (the signal data comprising modulations of the carrier wave frequency).

The RC filter 220 comprising a resistor 221 and capacitor 222 is used to further reduce noise that may be caused by ripple or spikes in the voltage supply line, preventing introduction of voltage supply noise into the signal.

The microcontroller 230 is a small computer that is specially programmed to extract signal characteristics from the demodulated signal from the IR receiver. As the IR signal is received, the microcontroller 230 looks for readily-identifiable characteristics in the signal such as extended high (on) or low (off) periods in the signal data. From these readily-identifiable characteristics, the microcontroller 230 can identify when the signal repeats so as to isolate a single instance (or repeated instance) of the signal for decoding of the signal protocol. Once the signal instance has been identified, the microcontroller 230 decodes the signal by identifying the start sequence (or header) comprising the start timing of the signal, the data sequence comprising a number of data bits in the signal (which may also be referred to as the signal wavelength), the zero-bit timing of the signal, the one-bit timing of the signal, any intra-signal delay timings, the end sequence comprising an end timing of the signal, and the inter-signal delay timing. The microcontroller 230 may convert the decoded IR signal into digital form for several reasons (e.g., data compactness, matching efficiency, etc.). The decoded IR signal is then transmitted to a signal protocol detector for detection and matching of the signal with any known signal protocols. In some embodiments, the signal protocol detector will be cloud-based.

Figure 3:
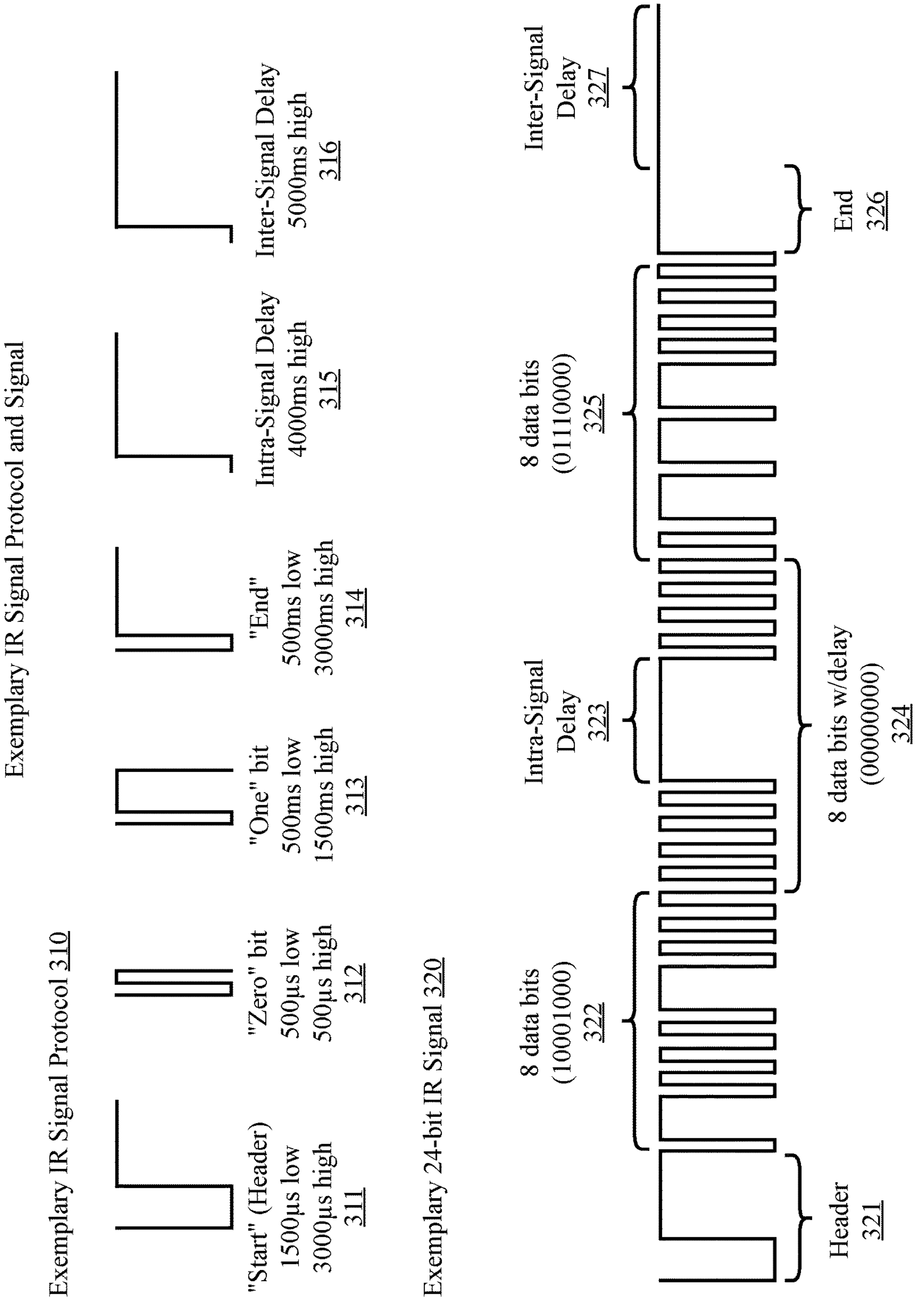
FIG. 3 is a diagram illustrating an exemplary infrared signal protocol and exemplary infrared signal based on the protocol.

FIG. 3 is a diagram illustrating an exemplary infrared signal protocol and exemplary infrared signal based on the protocol. In this example, an exemplary IR signal protocol is shown at 310 and an exemplary 24-bit IR signal using this protocol is shown at 320.

The exemplary signal protocol 310 is a fairly typical IR signal protocol for IR-controlled devices, although the timings shown and features shown will differ from manufacturer to manufacturer. Manufacturers use different signal protocols both to ensure that there is no interference with other IR-controlled devices and to make their IR signals proprietary to their IR-controlled devices. The parts of an IR signal protocol are comprised of sequences of high (infrared transmitter on) and/or low (infrared transmitter off) signals held for certain lengths of time. Here, the start of the IR signal is indicated by a "start" sequence (also known as a header sequence) 311 comprising a 1500 microsecond (μs) low signal followed by a 3000 (μs) high signal. Receipt of the start sequence indicates that a data sequence comprising one or more data bits will follow. In this example, a "zero" bit 312 is indicated by a 500 us low signal followed by a 500 us high signal, and a "one" bit 313 is indicated by a 500 us low signal followed by a 1500 us high signal. This differs from typical bit indications in electronics wherein a "zero" is commonly a zero voltage signal and a "one" bit is commonly indicated by a non-zero voltage (e.g., +5v). In IR signals, the bits are typically indicated by a low/high (or vice versa) combination held for certain periods of time. An "end" sequence 314 signals the end of the data transmission, shown in this example as a 500 us low signal followed by a 3000 us high signal. Some manufacturers introduce one or more intra-signal delays within the data sequence portion of the IR signal, shown in this exemplary protocol as a 4000 us high signal. IR signals are typically repeated for so long as the button on the IR remote controller is pressed, and between the end sequence of one repetition and the start of the next repetition there is often an inter-signal delay 315, shown in this exemplary protocol as a 5000 us high signal. Note that these protocols are exemplary and the patterns, timings, and high or low indications may be altered in real-world IR signals.

The exemplary IR signal shown at 320 is a 24-bit signal comprised of the IR signal protocol 310 described above. This exemplary IR signal 320 has a start sequence (header) 321 with timings of 1500 μs low/3000 μs high, a data sequence comprising 24 data bits shown for convenience in groups of 8 data bits 322, 324, 325, an intra-signal delay 323 of 4000 μs, an end sequence with timings of 500 μs low/3000 μs high, and an inter-signal delay of 5000 μs high. As can be seen by comparison with the exemplary IR signal protocol 310, there are a total of 24 data bits with the first eight data bits 322 representing "10001000" in binary, the second eight data bits 324 representing "00000000" in binary with the intra-signal delay 323 being ignored, and the third eight data bits representing "0111000" in binary.

IR Signals received can be decoded and broken down into the constituent protocol parts (start sequence, end sequence, zero-bit, one-bit, data sequence, delays) and a signal models can be created from the protocol. IR signals received can thus be matched to signal models in a database based on their protocol characteristics.

Figure 4:
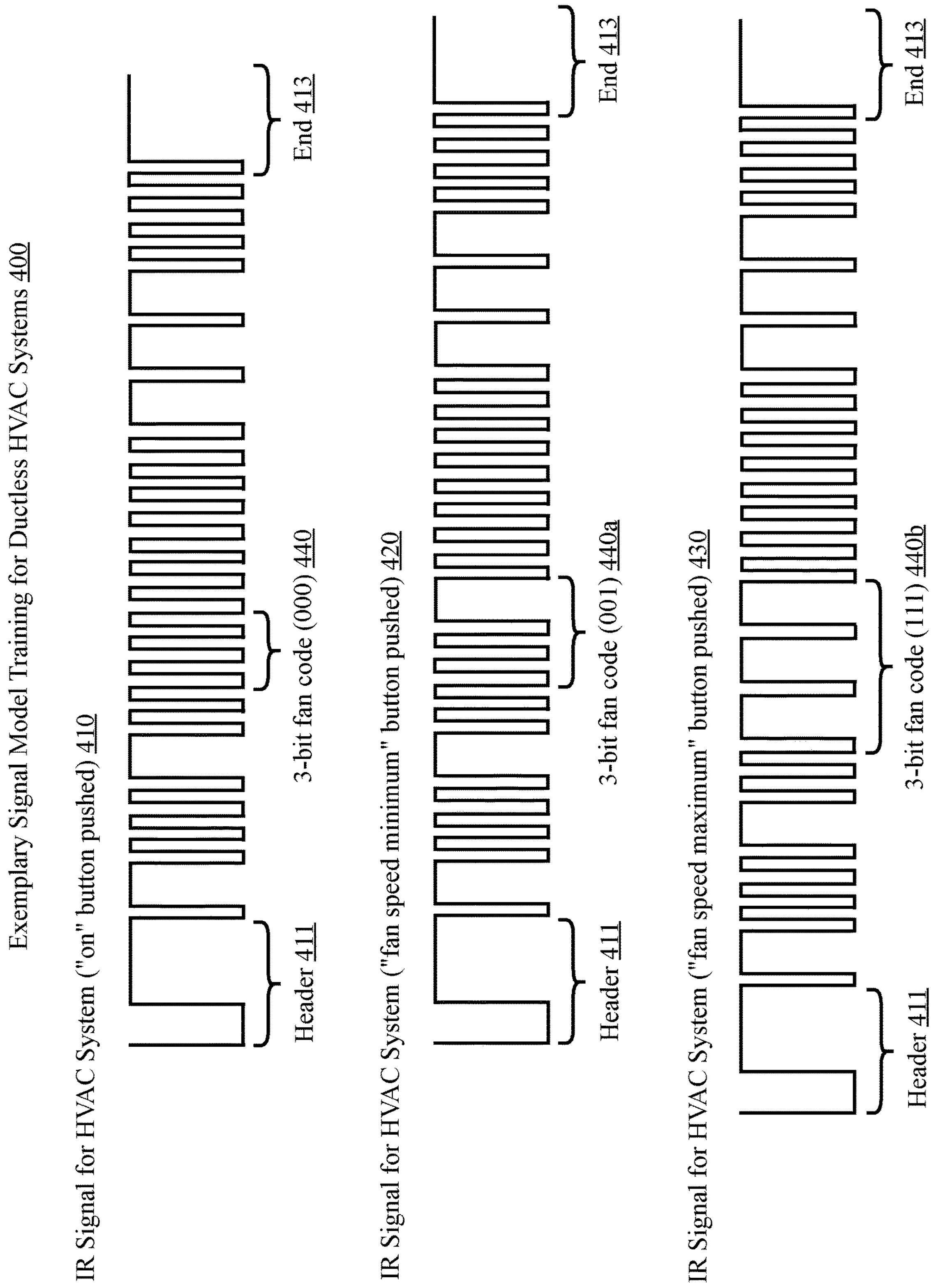
FIG. 4 is a diagram illustrating exemplary signal model training for a system for infrared signal protocol detection.

FIG. 4 is a diagram illustrating exemplary signal model training for a system for infrared signal protocol detection. In this example, IR signals 410, 420, 430 from three button presses of the same IR remote controller are received and used to partially train a signal model for that IR remote controller and its associated IR-controllable device.

Where a match for the IR signal is not found in the IR signal database 133, a new signal model manager 134 is used to create a new signal model for the IR remote controller from which the IR signal was received. The new signal model manager 134 receives the unmatched signal from the signal protocol detector and identifies the overall structure of the signal, including a start sequence (or header) comprising the start timing of the signal, a data sequence comprising a number of data bits in the signal (which may also be referred to as the signal wavelength), a zero-bit timing of the signal, a one-bit timing of the signal, one or more intra-signal delay timings, an end sequence comprising an end timing of the signal, and an inter-signal delay timing. Each of these characteristics can be identified by the new signal model manager 134 based on known properties of IR signals. For example, the start timing, end timing, and inter-signal delay can be calculated by identifying where the overall signal repeats. The "zero" bit timing and the "one" bit timing are typically substantially shorter than the start timing, end timing, intra-signal delays (if any), and inter-signal delay, and are thus readily distinguishable from those characteristics. The "zero" bit timing is typically shorter than the "one" bit timing, although variance from that patterns can be identified during signal model training. Intra-signal delays can be identified because they are typically longer than the "zero" bit timing and the "one" bit timing and interrupt sequences of "zero" and "one" bit without an end timing having been received.

In this example, the first IR signal received 410 is an IR signal from a ductless HVAC system resulting from the on/off button being pushed on its associated IR remote controller. According to the procedure outlined above, the signal is decoded, and the start sequence (header) 411 and end timing 413 are identified (along with other characteristics previously described but not shown in this example). A new model is created which includes a data sequence section in which a currently-unknown 3-bit fan code 440 is embedded. The 3-bit fan code in this exemplary first IR signal 410 is assumed to be a default "off" code for the HVAC fan ("000" in binary), meaning that the fan is instructed by default to be off (not running). A second IR signal is received from a second button push of the IR remote controller, this time resulting from a "fan speed minimum" button being pushed. The same start sequence (header) 411 and end timing 413 are identified and a single bit of the 3-bit fan code **440*a* has been changed from zero to one (i.e., from binary "000" to binary "001"). It can thus be surmised that at least that one bit is associated with the "fan speed minimum" function of the HVAC system. A third IR signal is received from a third button push of the IR remote controller, this time resulting from a "fan speed maximum" button being pushed. The same start sequence (header) 411 and end timing 413 are identified and a two additional bits of the 3-bit fan code 440***b* have been changed from zero to one (i.e., from binary "001" to binary "111"). As the fan speeds have been set throughout their entire range of speeds (off, minimum, and maximum), it can thus be surmised that the fan speeds are controlled by the 3-bit fan code 440 and that the fan has a total of 8 settings (off plus seven "on" speeds). It can be further surmised that the fan speeds are operated in sequential binary order from 000 to 111. Thus, a new signal model can be created from a small number of button pushes to identify primary functions of the IR-controllable device, filling in the complete functionality of each primary function (e.g., fan controls) using logical assumptions about the IR signals received from the button pushes.

If, however, a given primary function fails to operate the IR-controllable device according to the assumptions of the model, additional button pushes may be requested to capture additional IR signals related to that primary function. As the IR signals for each manufacturer are proprietary, some manufacturers intentionally separate the bits that control certain functions from one another, such that the bits that control that function are not together in the data sequence section of the IR signal protocol. For example, the 3-bit code 440 for control of fan speed may be separated into individual bits at bit 2, bit 7, and bit 18 of the 24-bit data sequence section shown in this example. While separating the operational bits of a primary function makes decoding and signal model creation more difficult, it also helps to uniquely identify the signal protocol of that particular manufacturer.

Figure 5:
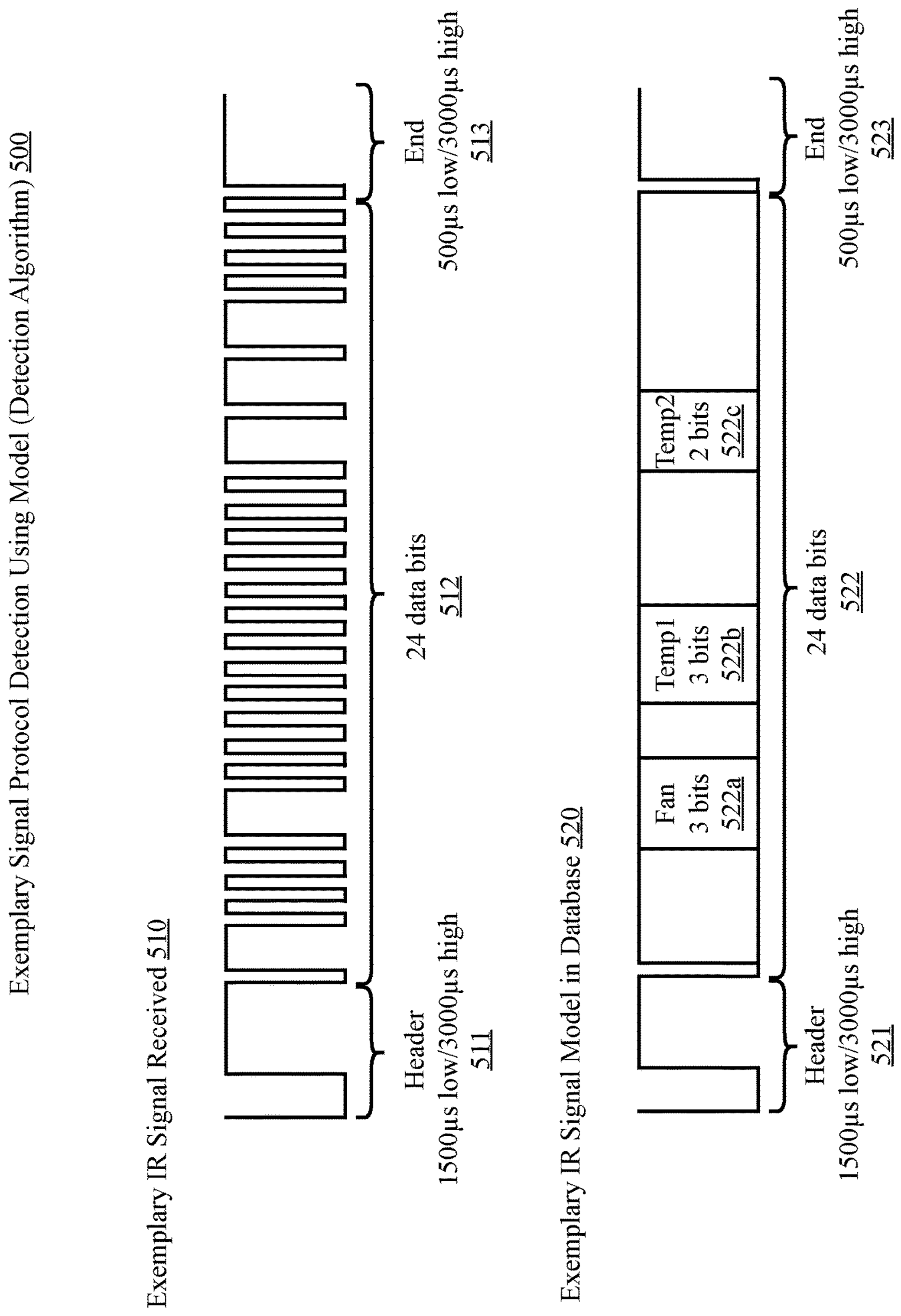
FIG. 5 is a diagram illustrating exemplary signal protocol detection using a signal model.

FIG. 5 is a diagram illustrating exemplary signal protocol detection using a signal model.

This exemplary signal protocol detection algorithm 500 shows how a signal protocol may be detected for an IR signal using a signal model. Using the system and method described herein, a single infrared signal from an infrared remote controller may be captured using an IR receiver, decoded using a signal processing circuit, and matched to signal models existing in a database. When a match is found for the single infrared signal, all of the functionalities of that infrared remote controller existing in the database are known and may be transferred to a third party device for operation of an IR device compatible with that controller.

Detection is performed on the decoded IR signal using a detection algorithm which compares the decoded IR signal to signal models in a database using one more of the following signal characteristics: a start sequence (or header) comprising the start timing of the signal, a data sequence comprising a number of data bits in the signal (which may also be referred to as the signal wavelength), a zero-bit timing of the signal, a one-bit timing of the signal, one or more intra-signal delay timings, an end sequence comprising an end timing of the signal, and an inter-signal delay timing. These signal characteristics are typically proprietary to each manufacturer of IR devices and their associated IR remote controllers. The proprietary nature of the signal characteristics makes use with third party devices and peripherals difficult. However, using the system and method described herein, the complete signal functionality (and often the manufacturer and model) of a given IR remote controller can be identified and recreated for use with third party devices and peripherals, requiring only a single signal to be captured from that IR remote controller.

In this example, an exemplary IR signal 510 is received for signal protocol detection. The IR signal 510 is decoded and its constituent characteristics are identified, in this case comprising a start sequence (header) 511 with timings of 1500 μs low/3000 μs high, 24 data bits 512, and an end sequence 513 with timings of 500 μs low/3000 μs high. These characteristics are then matched to a signal model 520 in a database comprising the same characteristics: a start sequence (header) 521 with timings of 1500 μs low/3000 μs high, 24 data bits 522, and an end sequence 523 with timings of 500 μs low/3000 μs high. Often, these three characteristics (start sequence, end sequence, and data bit length) alone are sufficient to match the signal protocol.

Once a signal protocol is identified from the matching process, any operational characteristics derived from the signal model training process are known. In this example, the 24-bit data section 522 of the signal model 520 comprises a 3-bit fan speed control 522*a* and a 5-bit temperature control having the bits separated into two parts: a 3-bit temp1 control 522*b* and a 2-bit temp2 control 522*c* (whose functions were determined during signal model training). The protocol, including its known operational characteristics, can then be uploaded to a third party device which can then control the IR-controllable device associated with that IR signal using the signal protocol and its known operational characteristics.

It is important to note that the timings of the various signal characteristics are unlikely to match as precisely in the real world as in the examples herein. Typically, the decoding of the IR signal received will have some minor variances in timing of the various characteristics due to real-world inaccuracies in measurement and other real-world factors. However, the variances in timing are typically small enough to amount to rounding errors that do not interfere with signal protocol detection. For example, a given IR signal using the start sequence (header) 511 with timings of 1500 μs low/3000 μs high may have real-world start sequence timings of 1517 μs low/2993 μs high. Tolerances can be set to accept matching despite these real-world variances in timing.

Figure 6:
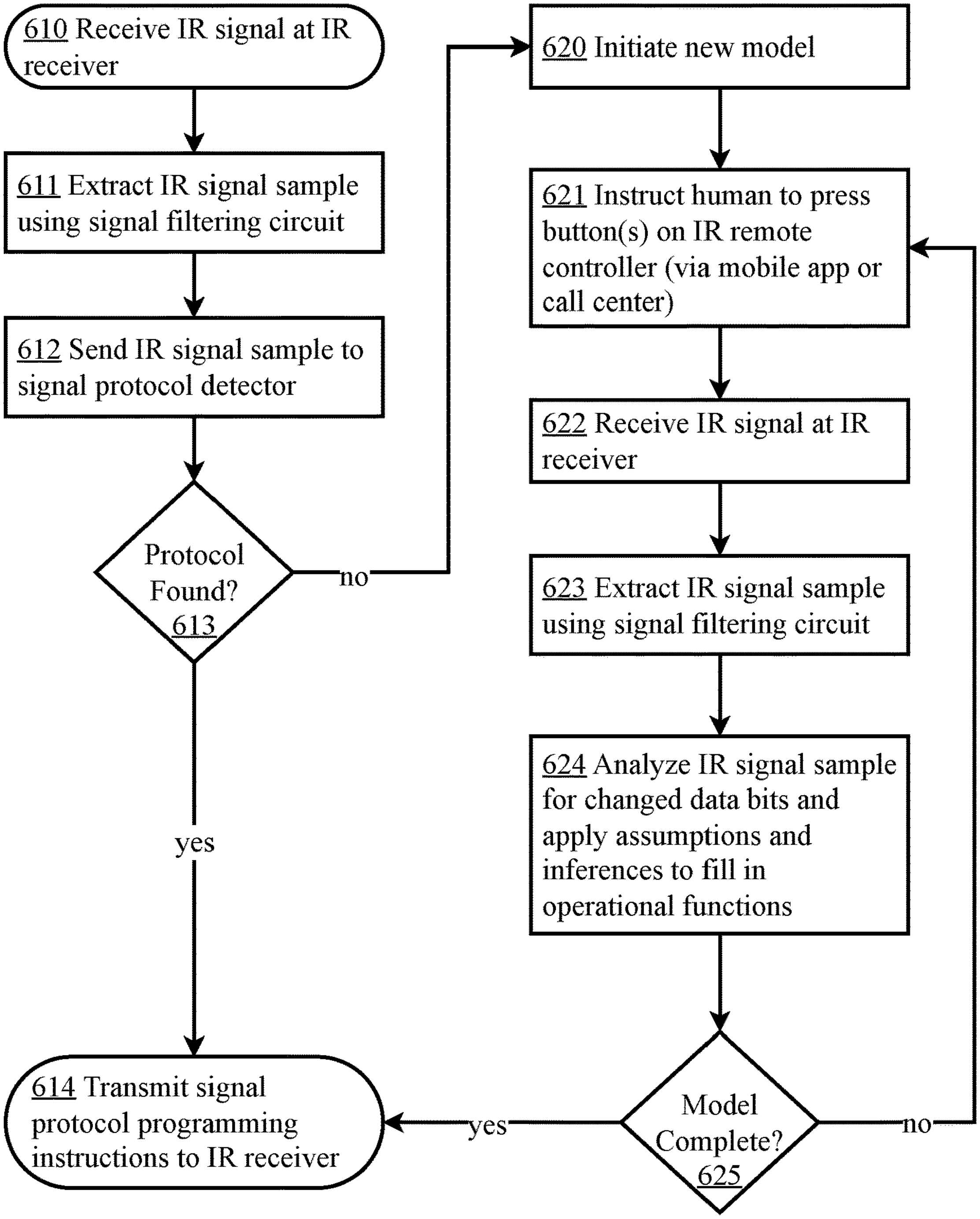
FIG. 6 is a diagram illustrating an exemplary algorithm for signal protocol detection and new signal model creation.

FIG. 6 is a diagram illustrating an exemplary algorithm for signal protocol detection and new signal model creation. In this exemplary algorithm 600, at step 610 a signal is first received at an IR receiver. At step 611, a decoded IR signal sample is extracted using a signal capture and processing circuit. At step 612, the decoded IR signal sample is sent to a signal protocol detector (which, in some embodiments, may reside on a cloud-based service). At step 613, the signal protocol detector attempts to match the decoded IR signal sample with IR signal models residing in a database. At step 614, if a match is found, programming instructions for the IR signal protocol associated with the matched signal are transmitted to the IR receiver for use in operating an IR-controllable device associated with that IR signal protocol. If no match is found, at step 620 a new signal model is initiated based on the signal protocol characteristics (comprising a start sequence, an end sequence, and a data bit section) of the decoded IR signal sample. At step 621, instructions are sent for a human user to press one or more buttons on the IR remote controller from which the decoded IR signal was received, the buttons corresponding to one or more primary functions of the IR remote controller. These instructions may be sent to a mobile device (e.g., via text messages, email, an application, etc.) or may be sent to a call center where a call center agent can read the instructions to the user and assist with the signal gathering process. For each button pressed, at step 622 the IR signal for that button press is received. At step 623, a decoded IR signal sample is extracted using the signal capture and processing circuit. At step 624, the decoded IR signal sample is analyzed for changed data bits (indicating which bits are associated with the function of the pressed button) and assumptions and inferences are applied to fill in the operational functions associated with changed bits as described in FIG. 4 above. At step 625, an assessment is made as to whether the signal model is complete or sufficiently complete (i.e., whether a sufficient number of primary functions of the data bits have been identified, which may be some, most, or all). If the signal model is not complete or sufficiently complete, the process of signal data acquisition is repeated starting from step 621. If the signal model is complete or sufficiently complete, programming instructions for the IR signal protocol associated with the newly-created and trained signal model are transmitted to the IR receiver for use in operating an IR-controllable device associated with that IR signal protocol, and the newly-created and trained signal model is stored in a signal model database.

Exemplary Computing Environment

Figure 7:
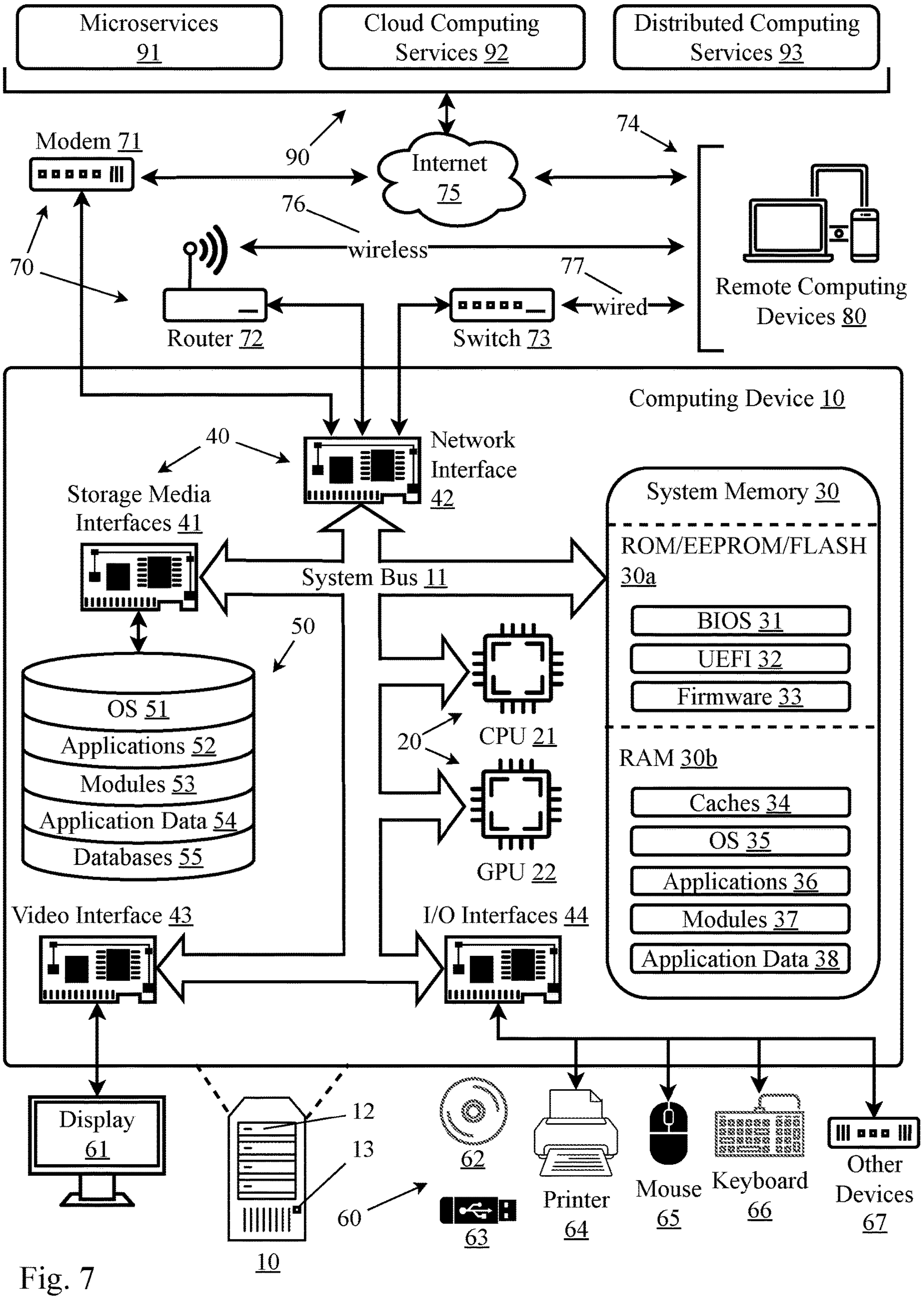
FIG. 7 illustrates an exemplary computing environment on which an embodiment described herein may be implemented.

FIG. 7 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses.

Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for infrared signal protocol detection, the system comprising:

a signal capture and processing circuit comprising an infrared (IR) receiver configured to receive infrared signals for infrared-controllable devices and a microcontroller for decoding received infrared signals into signal protocol characteristics;

a computing device comprising a memory, a processor, and a non-volatile data storage device;

an IR signal database stored on the non-volatile data storage device, the IR signal database comprising one or more signal models, each signal model comprising one or more signal protocol characteristics; and a signal protocol detector comprising a first plurality of programming instructions stored in the memory which, when operating on the processor, causes the computing device to:

receive a first IR signal from the signal capture and processing circuit, the first IR signal corresponding to a function of an IR remote controller and comprising a first signal protocol characteristic, wherein the first IR signal comprises a first plurality of signal characteristics comprising a first start sequence, a first end sequence, and a first data sequence comprising one or more data bits;

match the first IR signal to a signal model stored in the IR signal database by comparing the first signal protocol characteristic with a second signal protocol characteristic of the signal model, the second signal protocol characteristic of the signal model matching the first signal protocol characteristic within a pre-determined margin of error, wherein the signal model comprises a second plurality of signal characteristics comprising a second start sequence, a second end sequence, and a second data sequence comprising one or more data bits, wherein the signal protocol detector matches the first IR signal to the signal model by comparing one or more of the first plurality of signal characteristics to one or more of the second plurality of signal characteristics within a pre-determined margin of error;

transmit the signal model to a device configured to use the signal model for operation of an IR-controllable device; and a new signal model manager comprising a second plurality of programming instructions stored in the memory which, when operating on the processor, causes the computing device to:

where no match is found between the first IR signal and any signal model in the IR signal database, initiate a new signal model creation process causing the computing device to:

create a new signal model from the first plurality of signal protocol characteristics;

transmit instructions for generation of additional IR signals from the IR remote controller, each instruction comprising a request to operate a certain function of the IR remote controller;

receive the additional IR signals from the signal capture and processing circuit; and for each additional IR signal received:

determine which data bits of the one or more data bits of the first data sequence have changed;

associate the changed data bits with the certain function requested for that IR signal received;

infer a range of values for the certain function from the changed data bits;

update the new signal model with the association of the changed data bits with the certain function and the inferred range of values for the certain function; and transmit the new signal model to the device configured to use the new signal model for operation of an IR-controllable device.

2. The system of claim 1, wherein the computing device is a cloud-based service.

3. The system of claim 2, wherein the instructions are transmitted to a mobile device via an application operating on the mobile device.

4. The system of claim 2, wherein the instruction are transmitted to a mobile device via text messaging or email.

5. The system of claim 2, wherein the instructions are transmitted to a call center for an agent to remotely assist a user in following the instructions.

6. The system of claim 2, wherein the signal capture and processing circuit is embedded into the device to which the signal model is transmitted.

7. The system of claim 6, wherein the device to which the signal model is transmitted is a smart thermostat configured to control IR-controllable ductless HVAC devices.

8. A method for infrared signal protocol detection, the method comprising:

using a signal capture and processing circuit comprising an infrared (IR) receiver to receive infrared signals for infrared-controllable devices and a microcontroller to decode received infrared signals into signal protocol characteristics;

storing an IR signal database stored on a non-volatile data storage device of a computing device comprising a memory, a processor, and the non-volatile data storage device, the IR signal database comprising one or more signal models, each signal model comprising one or more signal protocol characteristics;

using a signal protocol detector operating on the computing device to perform:

receiving a first IR signal from the signal capture and processing circuit, the first IR signal corresponding to a function of an IR remote controller and comprising a first signal protocol characteristic, wherein the first IR signal comprises a first plurality of signal characteristics comprising a first start sequence, a first end sequence, and a first data sequence comprising one or more data bits;

matching the first IR signal to a signal model stored in the IR signal database by comparing the first signal protocol characteristic with a second signal protocol characteristic of the signal model, the second signal protocol characteristic of the signal model matching the first signal protocol characteristic within a pre-determined margin of error, wherein the signal model comprises a second plurality of signal characteristics comprising a second start sequence, a second end sequence, and a second data sequence comprising one or more data bits, wherein the signal protocol detector is used to match the first IR signal to the signal model by comparing one or more of the first plurality of signal characteristics to one or more of the second plurality of signal characteristics within a pre-determined margin of error;

transmitting the signal model to a device configured to use the signal model for operation of an IR-controllable device; and using a new signal model manager operating on the computing device to perform:

based on no match being found between the first IR signal and any signal model in the IR signal database, initiating a new signal model creation process by:

creating a new signal model from the first plurality of signal protocol characteristics;

transmitting instructions for generation of additional IR signals from the IR remote controller, each instruction comprising a request to operate a certain function of the IR remote controller;

receiving the additional IR signals from the signal capture and processing circuit; and for each additional IR signal received:

determining which data bits of the one or more data bits of the first data sequence have changed;

associating the changed data bits with the certain function requested for that IR signal received;

inferring a range of values for the certain function from the changed data bits;

updating the new signal model with the association of the changed data bits with the certain function and the inferred range of values for the certain function; and transmitting the new signal model to the device configured to use the new signal model for operation of an IR-controllable device.

9. The method of claim 8, wherein the computing device is a cloud-based service.

10. The method of claim 9, wherein the instructions are transmitted to a mobile device via an application operating on the mobile device.

11. The method of claim 9, wherein the instructions are transmitted to a mobile device via text messaging or email.

12. The method of claim 9, wherein the instructions are transmitted to a call center for an agent to remotely assist a user in following the instructions.

13. The method of claim 9, wherein the signal capture and processing circuit is embedded into the device to which the signal model is transmitted.

14. The method of claim 13, wherein the device to which the signal model is transmitted is a smart thermostat configured to control IR-controllable ductless HVAC devices.

* * * * *